(12) United States Patent
Boyce et al.

(10) Patent No.: US 11,905,702 B2
(45) Date of Patent: Feb. 20, 2024

(54) FABRICATION METHOD AND USE OF INTERLOCKING JOINTS FOR FIBERGLASS MAT PRODUCTS

(71) Applicant: JOHNS MANVILLE, Denver, CO (US)

(72) Inventors: Joshua Merrell Boyce, Littleton, CO (US); Ames Kulprathipanja, Broomfield, CO (US)

(73) Assignee: Johns Manville, Denver, CO (US)

( * ) Notice: Subject to any disclaimer, the term of this patent is extended or adjusted under 35 U.S.C. 154(b) by 114 days.

(21) Appl. No.: 17/464,434

(22) Filed: Sep. 1, 2021

(65) Prior Publication Data

US 2023/0068921 A1   Mar. 2, 2023

(51) Int. Cl.
| | | |
|---|---|---|
| *E04B 2/00* | (2006.01) | |
| *E04B 1/38* | (2006.01) | |
| *E04B 1/76* | (2006.01) | |
| *E04B 2/02* | (2006.01) | |

(52) U.S. Cl.
CPC ............ *E04B 1/541* (2023.08); *E04B 1/7662* (2013.01); *E04B 2/02* (2013.01); *E04B 2002/0234* (2013.01); *E04B 2002/0239* (2013.01); *E04B 2103/04* (2013.01)

(58) Field of Classification Search
CPC ............... E04B 1/54; E04B 2002/0234; E04B 2002/0239
See application file for complete search history.

(56) References Cited

U.S. PATENT DOCUMENTS

| | | | | |
|---|---|---|---|---|
| 527,961 A | * | 10/1894 | Furness | 52/311.2 |
| 675,344 A | * | 5/1901 | Bates | E04F 15/02 |
| | | | | 52/311.2 |
| 708,194 A | * | 9/1902 | Bennett | E04F 15/02 |
| | | | | 52/311.2 |
| 708,470 A | * | 9/1902 | Flood | 52/311.2 |
| 899,410 A | * | 9/1908 | Kilbride | 52/591.1 |
| 928,320 A | * | 7/1909 | Moore | 52/311.2 |
| 1,162,409 A | * | 11/1915 | Shimer | 52/590.1 |
| 1,167,746 A | * | 1/1916 | Funsten | E04B 2/22 |
| | | | | 52/611 |
| 1,347,247 A | * | 7/1920 | Caine | E21D 11/08 |
| | | | | 52/590.2 |
| 1,568,613 A | * | 1/1926 | Munson | E04B 2/14 |
| | | | | 52/430 |

(Continued)

FOREIGN PATENT DOCUMENTS

| | | |
|---|---|---|
| DE | 197 36 052 A1 | 2/1999 |
| EP | 2 303741 B1 | 11/2012 |

*Primary Examiner* — Basil S Katcheves
(74) *Attorney, Agent, or Firm* — Robert D. Touslee

(57) ABSTRACT

An insulation product may include an insulation material. The insulation material may include at least one material selected from the group consisting of nonwoven insulation, aerogel insulation, mineral insulation, and foam insulation. The insulation material may include a first end and a second end positioned opposite the first end. The first end may include a protrusion. At least a portion of the protrusion may widen in a direction opposite the second end. The second end may define a cutout that substantially matches a size and shape of the protrusion. The cutout and the protrusion may be aligned with one another along a length of the insulation material.

8 Claims, 7 Drawing Sheets

(56) References Cited

U.S. PATENT DOCUMENTS

| | | | | |
|---|---|---|---|---|
| 1,684,050 A * | 9/1928 | Adams | | E04B 2/06 |
| | | | | 52/590.2 |
| 2,178,984 A | 11/1939 | Zimmerman | | |
| 3,077,426 A * | 2/1963 | Johnston | | E04B 9/0464 |
| | | | | 52/794.1 |
| 3,078,880 A | 2/1963 | Stephens | | |
| 3,701,214 A * | 10/1972 | Sakamoto | | A63H 33/082 |
| | | | | 446/116 |
| 3,909,996 A * | 10/1975 | Ettlinger, Jr. | | E04F 15/02172 |
| | | | | 52/177 |
| 4,018,025 A * | 4/1977 | Collette | | E04F 15/02188 |
| | | | | 52/302.3 |
| 4,287,693 A * | 9/1981 | Collette | | B32B 3/06 |
| | | | | 52/302.1 |
| 4,532,747 A * | 8/1985 | Koetje | | F16B 5/0052 |
| | | | | 29/523 |
| 4,922,678 A * | 5/1990 | Scheiwiller | | E01F 8/0082 |
| | | | | 52/570 |
| 5,052,158 A * | 10/1991 | D'Luzansky | | F16B 17/008 |
| | | | | 428/44 |
| 5,169,700 A | 12/1992 | Meier et al. | | |
| 5,202,166 A * | 4/1993 | Crompton | | A63F 9/001 |
| | | | | 428/33 |
| 5,212,842 A * | 5/1993 | Glydon | | A63H 33/082 |
| | | | | 428/44 |
| 5,556,228 A * | 9/1996 | Smith | | E02B 3/14 |
| | | | | 405/20 |
| 5,721,032 A * | 2/1998 | Parker | | B29C 65/56 |
| | | | | 428/57 |
| 6,073,929 A * | 6/2000 | Nahon | | A63F 9/1208 |
| | | | | 273/156 |
| 6,526,705 B1 * | 3/2003 | MacDonald | | E04F 15/02 |
| | | | | 428/44 |
| 6,640,513 B2 * | 11/2003 | Ku | | E04F 15/02 |
| | | | | 52/177 |
| 7,470,166 B2 * | 12/2008 | Allen | | A63H 18/00 |
| | | | | 446/108 |
| 7,797,890 B2 * | 9/2010 | Thrush | | E04F 15/10 |
| | | | | 52/177 |
| 7,980,040 B2 * | 7/2011 | Pacione | | E04B 1/28 |
| | | | | 52/584.1 |
| 8,071,186 B1 * | 12/2011 | Quimby | | A47G 27/0206 |
| | | | | 52/177 |
| D653,893 S * | 2/2012 | Huss | | B29C 39/10 |
| | | | | D6/582 |
| 8,266,857 B2 * | 9/2012 | David | | B44C 5/04 |
| | | | | 52/177 |
| 8,356,447 B2 * | 1/2013 | Lach | | B32B 21/047 |
| | | | | 52/592.1 |
| 8,683,769 B2 * | 4/2014 | Cerny | | E04F 15/02194 |
| | | | | 52/584.1 |
| 8,732,953 B2 * | 5/2014 | Schubetzer | | F16B 5/0056 |
| | | | | 29/897.2 |
| 8,806,822 B1 * | 8/2014 | Wang | | E04F 15/105 |
| | | | | 52/592.1 |
| 8,833,007 B2 * | 9/2014 | Tillery | | E04F 15/22 |
| | | | | 52/177 |
| 8,881,482 B2 * | 11/2014 | Cerny | | E01C 13/045 |
| | | | | 52/126.5 |
| 8,919,054 B2 * | 12/2014 | Tillery | | E04F 15/02038 |
| | | | | 52/177 |
| 9,289,085 B2 * | 3/2016 | Thrush | | B32B 3/30 |
| 10,968,573 B2 * | 4/2021 | Szönyi | | E04F 15/02183 |
| 2006/0127647 A1 * | 6/2006 | Thrush | | B32B 3/10 |
| | | | | 428/172 |
| 2007/0006542 A1 * | 1/2007 | Duke | | F41H 5/04 |
| | | | | 52/561 |
| 2007/0068618 A1 | 3/2007 | Buchanan | | |
| 2010/0282060 A1 * | 11/2010 | Duke | | E04B 2/08 |
| | | | | 89/917 |
| 2018/0073248 A1 * | 3/2018 | Derleth | | E04B 5/48 |

* cited by examiner

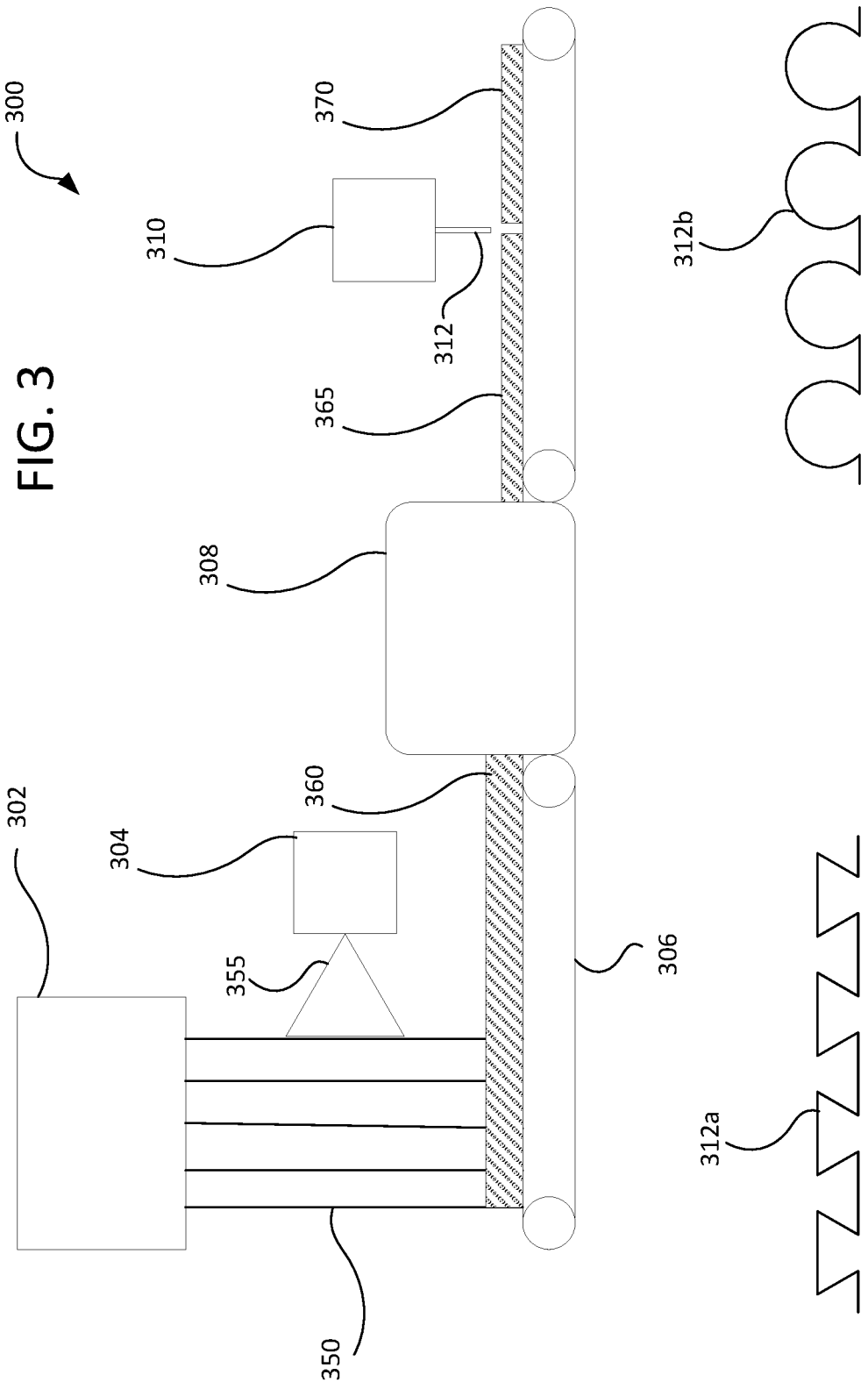

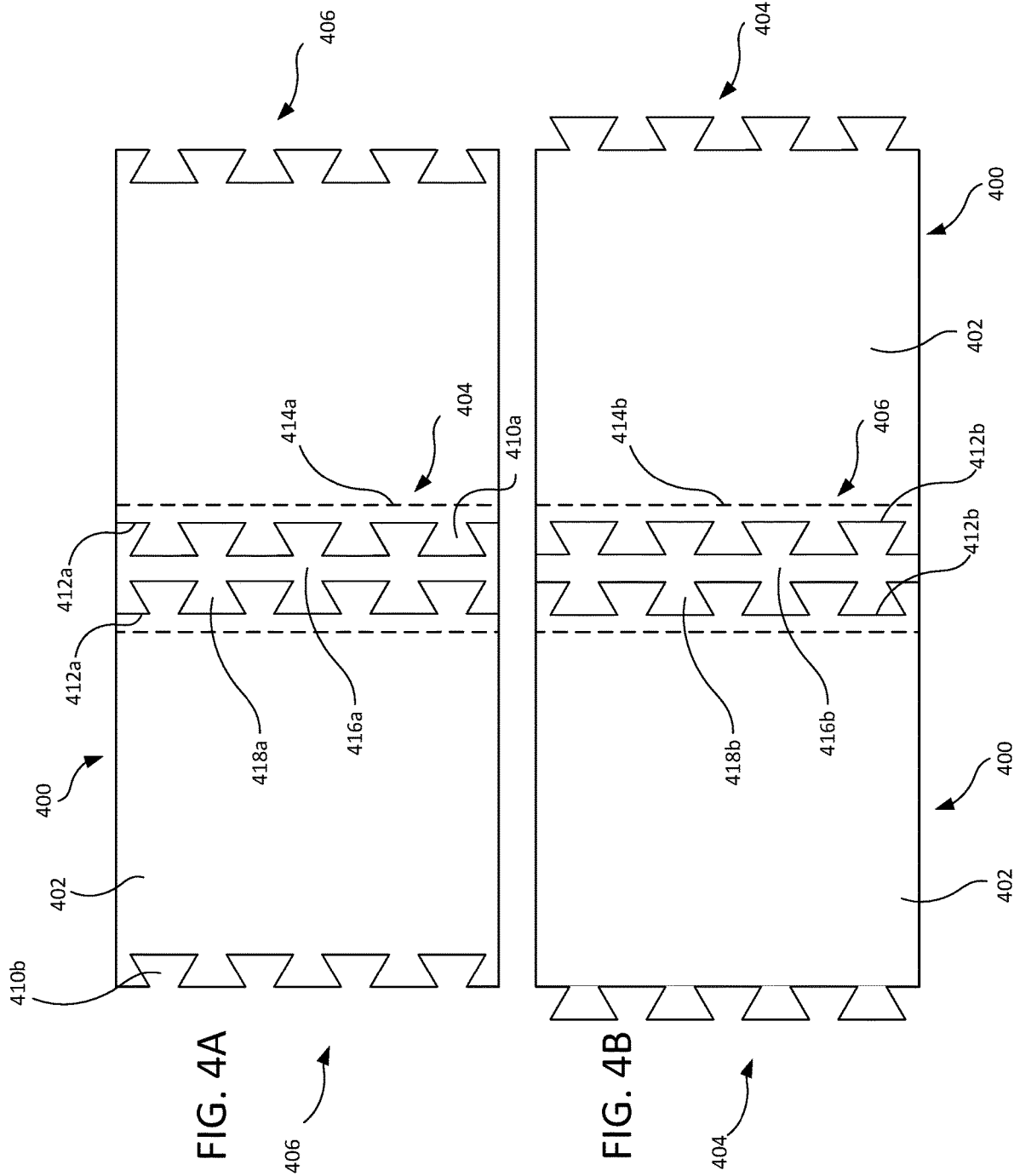

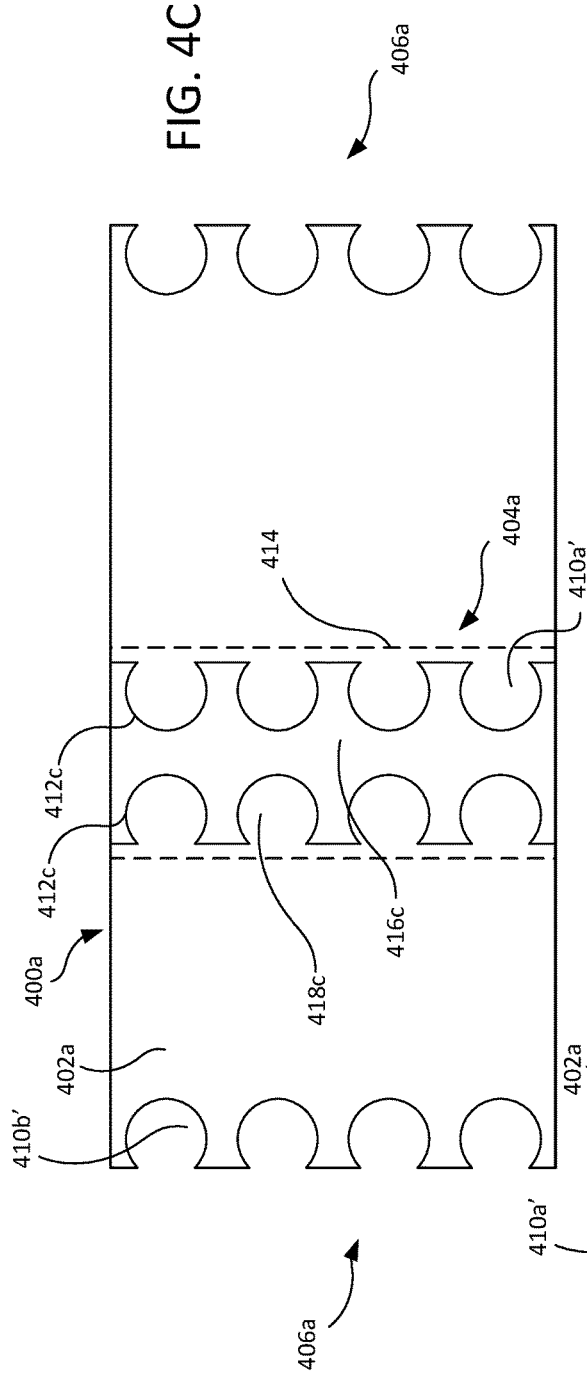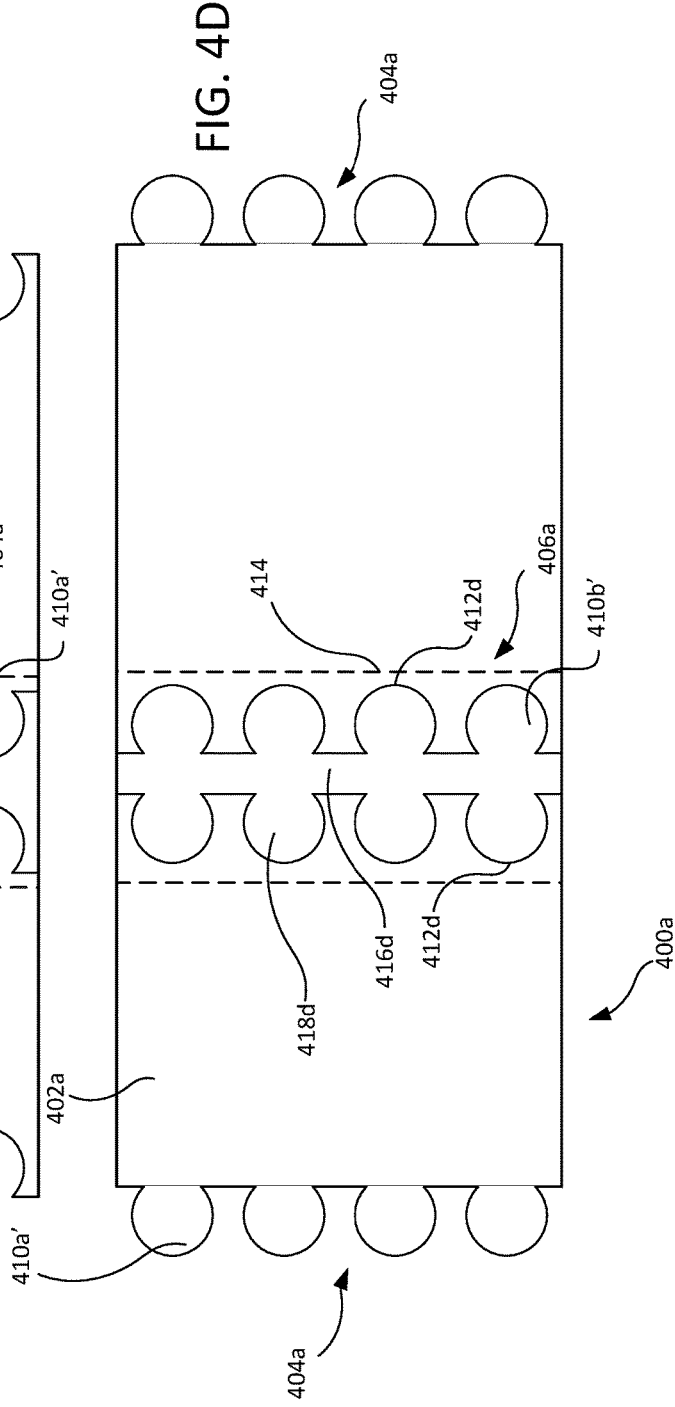

FABRICATION METHOD AND USE OF INTERLOCKING JOINTS FOR FIBERGLASS MAT PRODUCTS

BACKGROUND OF THE INVENTION

Fabricators within the insulation industry that purchase roll or blanket insulation typically use these materials for secondary operations to produce "kitted" or ready to use parts for end users. As in the case of HVAC insulation, a fabricator may take a roll insulation, laminate a facing to one side, and die cut the now-faced insulation into shapes designed to fit into specific HVAC equipment components. The two main losses for fabricators on lamination and cutting lines are downtime due to roll changeover and scrap from the splices or joints where one roll ends and another one begins. During a roll change, fabricators stop their production lines and affix or splice the beginning of the new roll to the end of the current roll. The ends of insulation rolls are traditionally a straight edge, leaving fabricators little choice but to use an overlapping joint. Once the splice has been applied to the end of the rolls, the equipment pulls the new roll through. As this material moves through the production line, it will be noticeably thicker due to the overlap of the two layers at the splice, and will cause a portion of the parts to be scrapped. Fabricators try to minimize this scrap loss by using the longest rolls of insulation possible to reduce the number of splices in a given production run.

BRIEF SUMMARY OF THE INVENTION

In one embodiment, an insulation product is provided. The insulation product may include an insulation material. The insulation material may include at least one material selected from the group consisting of nonwoven insulation, aerogel insulation, mineral insulation, and foam insulation. The insulation material may include a first end and a second end positioned opposite the first end. The first end may include a protrusion. At least a portion of the protrusion may widen in a direction opposite the second end. The second end may define a cutout that substantially matches a size and shape of the protrusion. The cutout and the protrusion may be aligned with one another along a length of the insulation material.

In some embodiments, the protrusion may be one of a plurality of protrusions disposed along a width of the first end. The cutout may be one of a plurality of cutouts defined along a width of the second end. Each of the plurality of protrusions may be in alignment with a respective one of the cutouts along the length of the insulation material. The insulation material may include a plurality of glass fibers and a binder. The first end further may define an additional cutout. The second end may include an additional protrusion. The additional cutout may be aligned with the additional protrusion along the length of the insulation material. The protrusion may have an undercut shape. The protrusion and the cutout may have generally trapezoidal shapes. The protrusion and the cutout may have partially circular shapes.

In another embodiment, an insulation product is provided. The insulation product may include a first insulation material that may include at least one material selected from the group consisting of nonwoven insulation, aerogel insulation, mineral insulation, and foam insulation The insulation product may include a second insulation material that may include at least one material selected from the group consisting of nonwoven insulation, aerogel insulation, mineral insulation, and foam insulation. Each of the first insulation material and the second insulation material may include a first end and a second end opposite the first end. The first end of each of the first insulation material and the second insulation material may include a protrusion. The second end of each of the first insulation material and the second insulation material may define a cutout that has a size and shape that substantially matches a size and shape of the protrusion. The protrusion of the first insulation and the cutout of the second insulation may be aligned with one another when lateral edges of the first insulation material and the second insulation material are aligned with one another.

In some embodiments, the protrusion of the first insulation material may be inserted within the cutout of the second insulation material, thereby securing the first insulation material and second insulation material together in an end-to-end configuration. The insulation product may include a reinforcement member positioned over a seam formed between the first insulation material and the second insulation material. The reinforcement member may include one or both of a glass mat facer and adhesive tape. The insulation product may include a splice insert positioned between the first insulation material and the second insulation material. The splice insert may include interlocking features that receive the protrusions of each of the first ends or that are insertable within the cutouts of each of the second ends to secure the first insulation material and second insulation material together in an end-to-end configuration. The insulation product may include a reinforcement member positioned over both seams formed between the first insulation material, the splice insert, and the second insulation material. The insulation product may include a first reinforcement member positioned over a first seam formed between the first insulation material and the splice insert and a second reinforcement member positioned over a second seam formed between the splice insert and the second insulation material.

In some embodiments, a method of manufacturing an insulation product is provided. The method may include providing an insulation material that includes at least one material selected from the group consisting of nonwoven insulation, aerogel insulation, mineral insulation, and foam insulation. The method may include making a first cut in the insulation material to form a first end of an insulation product and making a second cut in the insulation material at a distance from the first cut to form a second end of the insulation product. The first cut and the second cut may be made using a nonlinear blade.

In some embodiments, the nonlinear blade may cut an interlocking pattern into the insulation material on either side of the nonlinear blade. The method may include trimming sides of the insulation material prior to making the first cut. The method may include rolling the insulation product and shrink-wrapping the rolled insulation product. The method may include cutting the insulation material in multiple pieces along a thickness of the insulation material to form a multi-layer insulation material prior to making the first cut. Providing the insulation material may include combining a plurality of glass fibers with a binder and compressing and heating the plurality of glass fibers and the binder to cure the binder and form the insulation material.

BRIEF DESCRIPTION OF THE DRAWINGS

A further understanding of the nature and advantages of the disclosed technology may be realized by reference to the remaining portions of the specification and the drawings.

FIG. 3 illustrates a system for manufacturing interlocking insulation products according to some embodiments of the present technology.

FIG. 3A illustrates an embodiment of a nonlinear cutting blade of the system of FIG. 3 according to some embodiments of the present technology.

FIG. 3B illustrates an embodiment of a nonlinear cutting blade of the system of FIG. 3 according to some embodiments of the present technology.

FIG. 4A shows one embodiment of interlocking insulation products coupled using a splice insert according to some embodiments of the present technology.

FIG. 4B shows one embodiment of interlocking insulation products coupled using a splice insert according to some embodiments of the present technology.

FIG. 4C shows one embodiment of interlocking insulation products coupled using a splice insert according to some embodiments of the present technology.

FIG. 4D shows one embodiment of interlocking insulation products coupled using a splice insert according to some embodiments of the present technology.

Figure 1:
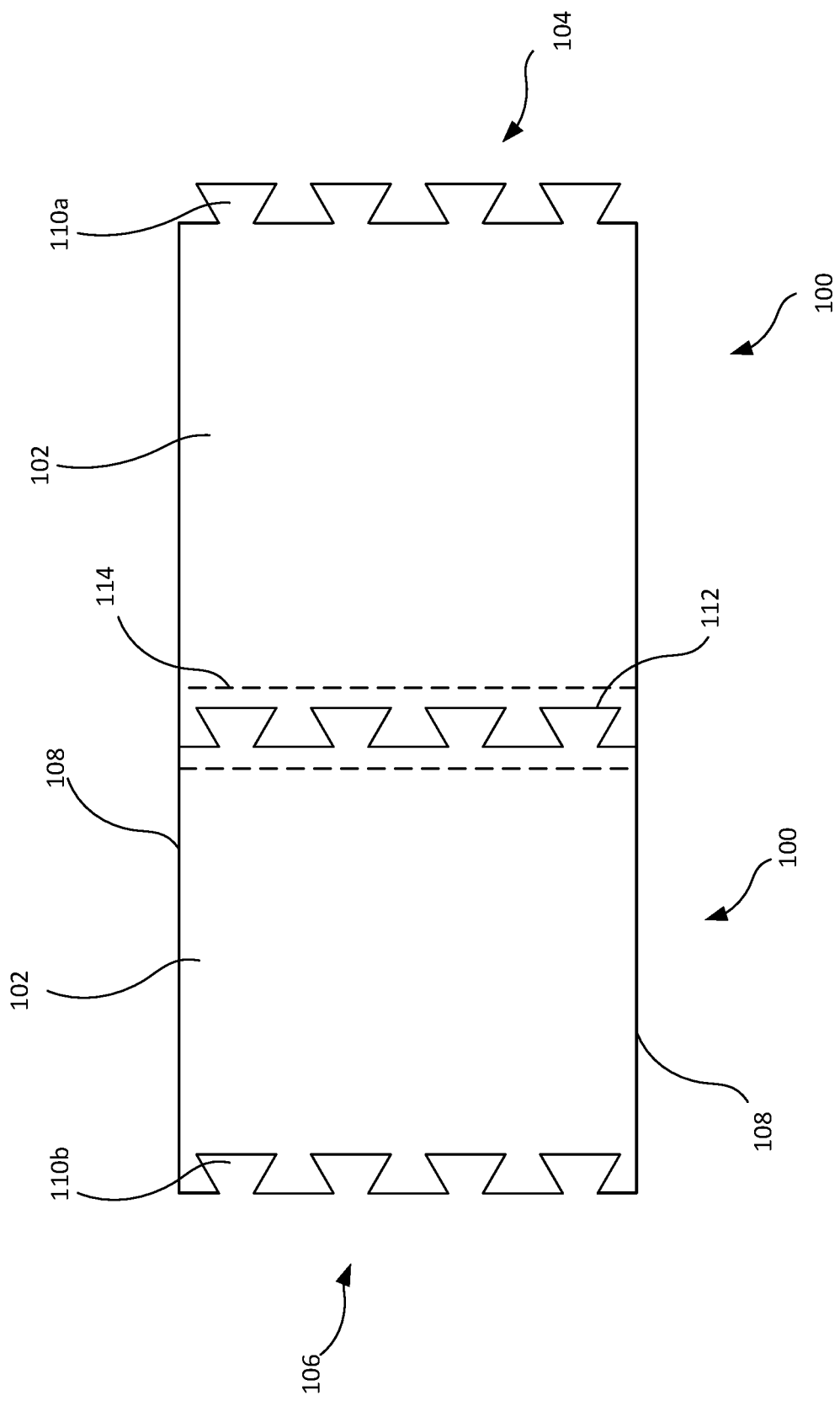
FIG. 1 shows one embodiment of interlocking insulation products according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the present invention are directed to insulation products and methods of manufacturing insulation materials. In particular, the insulation materials in accordance with the present technology include nonlinear, interlocking ends that enable splicing of multiple pieces of insulation product without the need to overlap ends of adjacent pieces of insulation product. For example, embodiments of insulation materials may include interlocking edges that enable adjacent pieces of insulation products to be coupled end-to-end with the interlocking edges being substantially coplanar with one another. These interlocking edges enable any number of pieces of insulation product to be coupled together and treated as one monolithic piece in subsequent fabrication processes. In some embodiments, to further strengthen the joint formed at the interface of two adjacent interlocking edges, an adhesive tape and/or adhesive mat may be applied across the joint. Such material may provide added tensile strength further prevent joint separation while minimally increasing the thickness of the insulation material. The seam cover or other reinforcement member may be applied by insulation users and/or fabricators.

In some embodiments, splice inserts having interlocking features may be provided that are inserted between adjacent pieces of insulation product and that couple the pieces of insulation product together. As just one example, dual-layer insulation materials may utilize splice inserts that have interlocking features that mate with corresponding features on ends of the dual-layer insulation materials to mate adjacent pieces of the dual-layer insulation materials together.

Turning now to FIG. 1, two interlocked insulation products 100 are shown. Each insulation product 100 may be formed from an insulation material 102. The insulation material 102 may be formed from any insulation product, such as insulation mats, boards, blankets, and/or other products formed of insulating foam, fiber insulation, textile insulation, and the like. For example, the insulation material 102 may include nonwoven insulation, aerogel insulation, mineral insulation, and/or foam insulation. Nonwoven insulation may include fiberglass, mineral wool, hydrophobic microporous blankets, needled E-glass and/or other nonwoven materials. Such insulation materials may be particular suitable for providing thermal, acoustic, and/or fire protective insulation. Aerogel insulation may include silica aerogel and/or other aerogel materials, and may be particularly suitable for thermal and fire protective insulation. Mineral insulation may include calcium silicate, perlite, and/or other mineral-based materials. Mineral insulation may be particularly suitable for thermal, fire protective, extreme environment, and/or corrosion-control insulation. Foam insulation may include polyisocyanurate foam, phenolic foam, expanded polystyrene and/or other foam-based insulation materials. Foam insulation may be particularly suitable for thermal, acoustic, and/or moisture control insulation. In some embodiments, the insulation material 102 may include one type of material, while in other embodiments multiple types of material within a single category (e.g., nonwoven, aerogel, mineral, foam, etc.) and/or spanning multiple categories may be provided in a single insulation material 102 in one or more layers. In some embodiments, both insulation materials 102 may be the same, while in other embodiments two different forms of insulation products may be joined using interlocking features.

In one particular embodiment, the insulation product 100 may be a fibrous product that is formed from a mixture of nonwoven fibers and a binder. For example, the fibers may be glass fibers (such as fiberglass, E-glass fibers, C glass fibers, T glass fibers, S glass fibers, and/or any known glass fiber), textile fibers (such as cellulose fibers, mineral wool fibers, etc.) and/or polymeric fibers (such as acrylic fibers, polyester fibers, polypropylene fibers, aramid fibers, nylon fibers, polyethylene fibers, rayon fibers, polyvinylidene fluoride (PVDF) fibers, polyethylene terephthalate (PET) fibers, and/or other polymeric fibers). The fibers may be of a single type or a combination of different fibers may be used. The fibers typically have diameters of between about 0.25 and 10 microns, and more commonly between about 0.7 and 5 microns. The density of the insulation product may often be between about 0.34 lb/ft$^3$ and 6 lb/ft$^3$, and more commonly between about 0.5 lb/ft$^3$ and 2.5 lb/ft$^3$, although other densities are possible in some embodiments. In some embodiments, the insulation product 102 may be or include binderless products. In other embodiments, the fibers may be held together using a binder, such as urea formaldehyde (UF) (which may include urea-extended phenyl formaldehyde) binders, acrylic binders, and/or other binders. Together, the fibers and binder may form an insulation material, such as a mat, board, batt, blanket, and/or other material form. In some embodiments, the insulation material 102 may include between about 75% and 100% by weight of fibers and between about 0% and 25% by weight of binder. The insulation material 102 may be formed to have any thickness, basis weight, and dimensions to meet the needs of a particular application.

As illustrated, each insulation material 102 may be generally rectangular, although other shapes of insulation materials 102 may be used. As shown here, the insulation material 102 has a first end 104, a second end 106 positioned opposite the first end 104, and lateral sides 108 that extend between the first end 104 and the second end 106. Each of the ends 104, 106 may be formed with one or more interlocking features 110. As just one example, the first end 104 may include at least one protrusion 110a. At least a portion of each protrusion 110a may widen in a direction opposite the second end 106 such that the portion of the protrusion 110a widens towards a distalmost end of the protrusion 110a. In other words, the protrusions 110a may be formed with shapes having keys and/or undercuts. In some embodiments, the distalmost end of the protrusion 110a may be the widest point of the protrusion, while in other embodiments a medial portion of the protrusion 110a may be wider than the distalmost end. For example, the protrusion 110a may first widen and then narrow in a direction toward the distalmost end of the protrusion 110a. As illustrated, each protrusion 110a has a trapezoidal or partial triangular shape, with a base of the triangle being positioned at the distalmost end of the protrusion 110a such that the protrusion 110a widens along its entire length.

In some embodiments, a single protrusion 110a may be provided on the first end 104, while in other embodiments a number of protrusions 110a may be arranged along a width of the first end 104. For example, any number of protrusions 110a may be positioned at regular and/or irregular intervals along the width of the first end 104. The protrusions 110a may all have the same size and shape and/or some or all of the protrusions 110a may have different sizes and/or shapes.

The second end 106 may define one or more cutouts 110b that correspond to the protrusions 110a on the first end 104. For example, each cutout 110b may substantially match a size and shape of a corresponding one of the protrusions 110a. As illustrated in FIG. 1, each cutout 110b is generally trapezoidal in shape such that each cutout 110b may receive a corresponding one of the protrusions 110a. A number of cutouts 110b may match the number of protrusions 110a. Each cutout 110b is aligned with a corresponding protrusion 110a along a length of the insulation material 102. This enables the first end 104 of one insulation product 100 to be coupled with the second end 106 of another insulation product 100 as shown in FIG. 1. By coupling two or more insulation products 100 in such a daisy-chained fashion, the interlocking insulation products may enable further processing steps to be continuous over multiple rolls of insulation product. This may help reduce downtime, as well as eliminate waste associated with splicing rolls of insulation using overlapping pieces of material. As noted above, the protrusions 110a may be formed having undercuts, which may enable the connections between adjacent insulation products 100 to have sufficient tensile strength to hold pieces of insulation product 100 together when fed through machinery that pulls and/or otherwise places the insulation materials under tension, which may allow multiple connected insulation products 100 to effectively serve as one continuous insulation product.

In some embodiments, the first end 104 and second end 106 may each include only protrusions 110a or cutouts 110b, while in other embodiments the first end 104 and second end 106 may each include a combination of one or more protrusions 110a and one or more cutouts 110b. In some embodiments, the pattern of interlocking features 110 may be arranged to form alternating protrusions 110a and cutouts 110b, while in other embodiments the arrangement of protrusions 110a and cutouts 110b may produce discrete and clearly distinguishable cutouts 110b and protrusions 110a.

In some embodiments, to further reinforce a seam 112 formed between adjacent insulation products 100, one or more reinforcement members 114 may be applied across the seam 112. For example, the reinforcement members 114 may include an adhesive tape and/or adhesive mat may be applied across the joint. Such a reinforcement member 114 may provide added tensile strength further prevent joint separation while minimally increasing the thickness of the insulation product 100. In embodiments that utilize an adhesive mat, the adhesive mat may be a glass mat facer.

Figure 2:
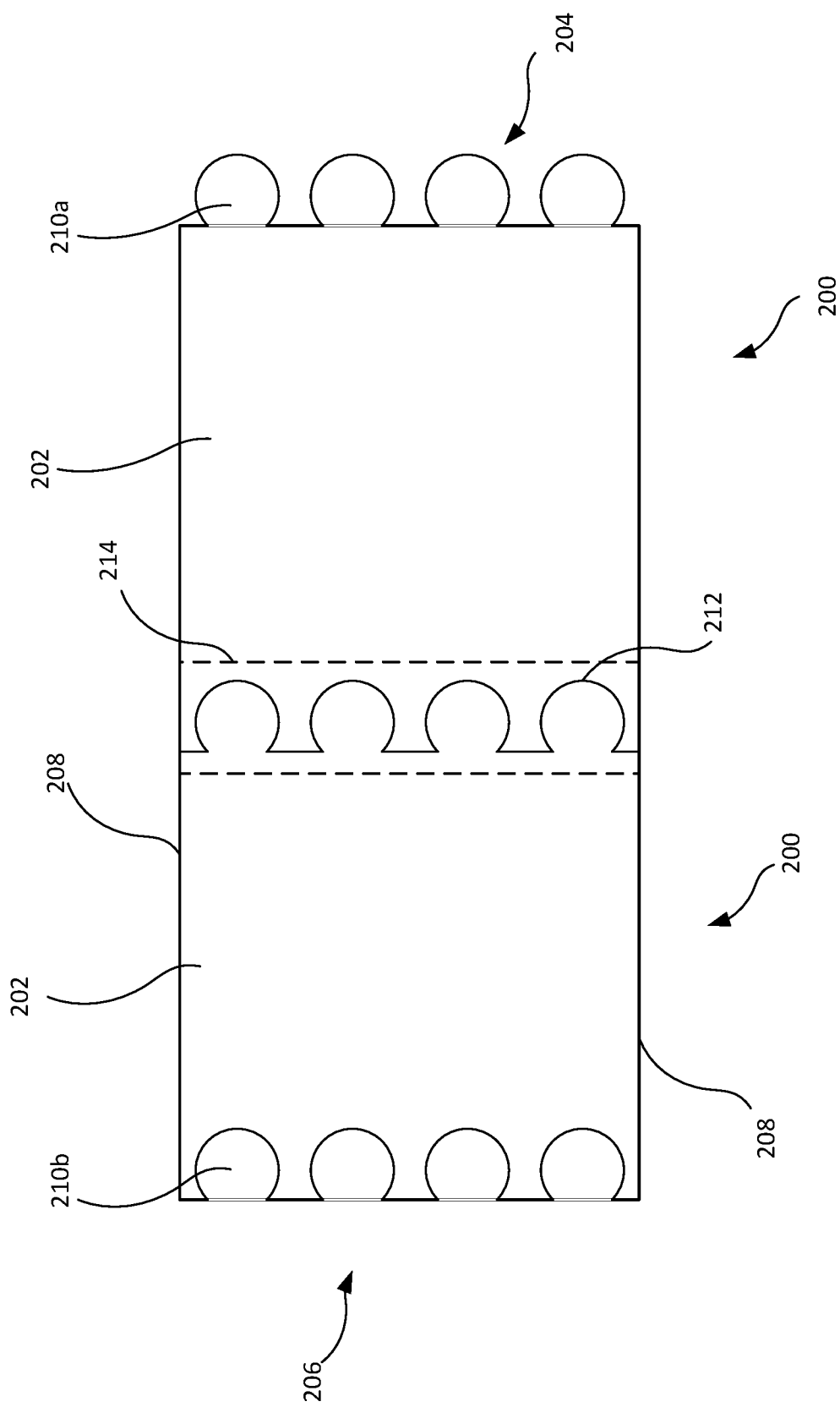
FIG. 2 shows one embodiment of interlocking insulation products according to some embodiments of the present technology.

While FIG. 1 illustrates trapezoidal or partially triangular protrusions 110a and cutouts 110b, it will be appreciated that any shape of protrusions 110a and/or cutouts 110b may be used as long as the shape includes an undercut that enables the first end 104 of one insulation product 100 to be interlocked and secured with a second end 106 of a second insulation product 100. As just one alternative, the protrusions and cutouts may be partial circular shapes or otherwise bulbous shapes. For example, FIG. 2 illustrates an insulation product 200 that is similar to insulation product 100. For example, the insulation product 200 may include an insulation material 202 that includes nonwoven insulation, aerogel insulation, mineral insulation, and/or foam insulation. The insulation material 202 may include a number of partial circular protrusions 210a and cutouts 210b. that enable a number of insulation products 200 to be joined in an end-to-end fashion. In some embodiments, a reinforcement member 214 may be positioned over the seam 212 formed between two adjacent insulation products 200 to help support the seam 212 and ensure that the insulation products 200 don't separate.

FIG. 3 illustrates a system 300 for manufacturing an insulation product, similar to insulation products 100 and/or 200. A fiber-forming unit 302, such as a rotary fiberizer or a flame-attenuated fiberizer, may be used to produce fibers. For example, streams of molten glass may be supplied to the fiber-forming unit 302, which generates thin fibers 350 (oftentimes having diameters of between about 0.7 and 5 microns) from the molten glass. The newly formed fibers 350 may be supplied to a conveyor belt 306 or other apparatus. For example, the fibers 350 may be collected on the conveyor belt 306 or other apparatus, where the fibers 350 may form a mat 360 or other structure. A binder 360 and/or water may be applied to the newly formed fibers after the fibers depart the fiber-forming unit 302. The binder 355 may be atomized and/or otherwise sprayed on the fibers 350 by a binder applicator 304. The binder 355 may be applied as the fibers 350 fall from the fiber-forming unit 302 to the conveyor belt 306 and/or may be applied after the fibers 350 have been collected atop the conveyor belt 306. Various binders 355 may be used. The selection of the binder 355 may depend on the application in which the insulation product is to be used, as well as on the type of fibers 350 being used. The binder 355 may be a UF binder, an acrylic binder, or other binder or mixture thereof. In some embodiments, one or more additives and/or additional chemicals (such as fire retardants, etc.) may be applied to the fibers 350 before, during, and/or after application of the binder 355. In some embodiments, the binder 355 may include one or more additives. In other embodiments, the insulation material may alternatively or additionally include other forms of insulation, such as aerogel, mineral, and/or foam materials. These materials may be formed using relevant equipment and may be part of system 300 and/or may be provided separately.

After the mat 360 or other form of the insulation material is produced, the insulation material, such as mat 360, may be passed through a curing oven 308. The curing oven 308 may compress and/or bake the insulation material to cure the binder 355 and set a desired density and/or thickness of the insulation material (and remove any water present). For example, the curing oven 308 may expose the fibers 350 and binder 355 to temperatures of between about 70° F. and 800° F. to cure the binder 355. In some embodiments, the curing oven 308 may force hot air through the fibers 350 to ensure that all of the binder 355 is properly set. In some embodiments, the curing oven 308 may pass the insulation material through one or more rollers that compress the insulation material to a desired thickness as the binder 355 is cured. A curing time and/or temperature may depend on the type of binder 355 used and the mass rate through the curing oven 308. In some embodiments, a cooling section may follow the curing oven 308. The cooling section may include one or more blowers that force air at ambient temperature though the fibrous material.

Once the compressed insulation material 365 has been cured and/or cooled, the edges of the insulation product 365 may be trimmed to produce insulation material of a desired width and to produce clean edges. The trimmed material 365 may then be passed under a cutting device 310, which may translate a blade 312 up and down to cut the trimmed material 365 into insulation products 370 of a desired length. In embodiments in which other forms of insulation are used, such insulation materials may be inserted into the cutting device 310 for similar cutting procedures. Oftentimes, the insulation product 370 is cut to lengths of between about 4 ft and 600 ft, although shorter or longer insulation products are possible. The blade 312 may be nonlinear across a length of the blade 312 such that the blade 312 may produce insulation products having ends with interlocking features such as shown in FIG. 1 and FIG. 2. For example, the blade 312 may have a shape that matches the shape of the first end and second end of the insulation product 100 (a blade 312*a* of FIG. 3A may produce insulation product 100) or 200 (a blade 312*b* of FIG. 3B may produce insulation product 200). This enables a single cut of the blade 312 to simultaneously cut the second end of a first insulation product 370 and the first end of a second insulation product 370. In some embodiments, rather than, or in addition to, using blade 312, the ends of the insulation products may be cut to have interlocking features using water jets, laser cutters, pneumatic cutting elements, and/or other traveling cutter mechanisms. After each the insulation product 370 is cut to a desired size, the insulation product 370 may be rolled up for subsequent storage and/or transportation.

In some embodiments, the finished interlocking insulation products may be further processed to produce specialized insulation products. For example, the insulation products may be used as HVAC insulation. A fabricator may laminate a facing to one side of a roll of the interlocking insulation product. A first end of the laminated product may then be inserted into a cutting device that die cuts (or otherwise cuts) the laminated insulation product into one or more shapes designed to fit various HVAC equipment components. Prior to the second end of the insulation product reaching the laminating device and/or cutting device, a second insulation product may be coupled with the first insulation product in an end-to-end fashion. For example, one or more interlocking features of the second end of the first insulation product may be engaged with corresponding interlocking features of the first end of the second insulation products. In some embodiments, one or more reinforcement members, such as tape and/or a glass mat, may be positioned and secured over the seam formed between the second end of the first insulation product and the first end of the second insulation product. Any number of insulation products may be secured together in such a feature, which may enable the final processing steps to be continuous over multiple rolls of insulation product. This may help reduce downtime, as well as eliminate waste associated with splicing rolls of insulation using overlapping pieces of material.

While described in embodiments where the interlocking insulation products are used in HVAC insulation applications, it will be appreciated that any number of finishing processes for various applications may be utilized in various embodiments. Any number of rolls or other pieces of interlocking insulation product may be joined together using the interlocking features prior to being used in any finishing processes.

In some embodiments, interlocking insulation products may be formed of dual-layer insulation material. In such embodiments, as the insulation material exits the curing oven, a saw may cut the insulation material through a thickness of the insulation material into multiple layers (two or more). As the nonlinear blade cuts the multiple layers of insulation material into desired lengths of interlocking insulation product, the nonlinear blade cuts the interlocking features of the first end and second end for adjacent insulation product. As there are two (or more) layers of insulation material being cut at the same time, each layer will have the same interlocking features on the same ends. After being cut into insulation products, both layers may be wound into a single roll, making a dual-layer roll. After rolling, matching ends may be at the center of the roll and at the outside of the roll. For example, in one embodiment the first ends of each layer of the insulation may be at the center of the roll, while the second ends of each layer of insulation may be at the outside of the roll.

During subsequent processing, the dual-layer roll of insulation product may be loaded into a piece of equipment (such as a die cutter). One layer of the insulation product may be fed into the equipment while the other layer is re-wound into a new single-layer roll. For example, the outer end (such as the second end) of one layer of the roll may be inserted into the processing equipment, while the outer end of the other layer of the roll is then re-wound and now forms a center of the re-wound roll with the opposing end (such as the first end) being on the outside of the re-wound roll. When it is time to feed the re-wound layer of insulation product into the equipment, the outer first end of the re-wound roll will then need to be affixed to the tail end (first end) of the first layer. As the adjacent ends have the same interlocking feature design, the ends will not be able to interlock with one another. In some embodiments, to join these ends (which may be protrusion to protrusion connections, cutout to cutout connections, etc.) specially designed male-to-male splice inserts and/or female-to-female splice inserts may be utilized to interlock the different rolls together.

FIGS. 4A-4D illustrate multiple insulation products being secured together using splice inserts. For example, as shown in FIG. 4A, two insulation products 400 are joined using splice inserts 416a. Insulation products 400 may be similar to insulation products 100 described above, and may each include insulation materials 402 having a first end 404 and a second end 406. The first end 404 may include one or more trapezoidal protrusions 410a and the second end 406 may define one or more trapezoidal cutouts 410b that are in alignment with a corresponding one of the protrusions 410a. It will be appreciated that some embodiments may include a combination of protrusions 410a and cutouts 410b on each of the first end 404 and the second end 406. The first end 404 of one of the insulation products 400 is secured to a first end 404 of another of the insulation products 400 using a splice insert 416a, which may occur when dual-layer insulation products are further processed as described above. As illustrated, splice insert 416a has a number of cutouts 418a on both a first end and a second end of the splice insert 416a. The cutouts 418a are sized and shaped to match the protrusions 410a, such that splice insert 416a may be coupled with the first end 404 of each of the insulation products 400 to secure the two first ends 404 together to form a larger insulation product. For example, the protrusions 410a of each first end 404 may be inserted within the cutouts 418a of the splice insert 416a to secure the insulation products 400 together.

The splice insert 416a may be formed from a same or different material as the insulation materials 402. Typically, the splice insert 416a may have the same lateral dimensions as the insulation products 400, although oftentimes is much shorter than each individual insulation produce 400. The splice insert 416a may have a thickness that substantially matches a thickness of each of the insulation products 400, although in some embodiments the splice insert 416a may be thicker or thinner than the insulation products 400. In some embodiments, multiple splice inserts 416a may be positioned between adjacent insulation products 400.

In some embodiments, one or more reinforcement members 414a may be positioned across the seam 412a formed at the junction of the insulation products 400 and the splice insert 416a. The reinforcement member 414a may be adhesive tape and/or an adhesive mat, such as described above. In some embodiments, each reinforcement member 414a may extend across both seams 412a of a given splice insert 416a such that the reinforcement member 414a extends from a first insulation product 400, over the splice insert 416a, and overlaps the first end of the second insulation product 400. In some embodiments, a reinforcement member 414a may extend over only a single seam 412a of a splice insert 416a, such that a separate reinforcement member 414a is needed to reinforce each seam 412a of the splice insert 416a.

FIG. 4B, illustrates two insulation products 400 that are joined using splice inserts 416b. Insulation products 400 may be similar to insulation products 100 described above, and may each include insulation materials 402 having a first end 404 and a second end 406. The first end 404 may include one or more trapezoidal protrusions 410a and the second end 406 may define one or more trapezoidal cutouts 410b that are in alignment with a corresponding one of the protrusions 410a. It will be appreciated that some embodiments may include a combination of protrusions 410a and cutouts 410b on each of the first end 404 and the second end 406. The second end 406 of one of the insulation products 400 is secured to a second end 406 of another of the insulation products 400 using a splice insert 416b, which may be similar to splice insert 416a. As illustrated, splice insert 416b has a number of protrusions 418b on both a first end and a second end of the splice insert 416b. The protrusions 418b are sized and shaped to match the cutouts 410b, such that splice insert 416b may be coupled with the second end 406 of each of the insulation products 400 to secure the two second ends 406 together to form a larger insulation product. For example, the protrusions 418b of the splice insert 416b may be inserted into the cutouts 410b of each second end 406 to secure the insulation products 400 together. In some embodiments, one or more reinforcement members 414b may be used to reinforce the seams 412b formed by the splice insert 416b and insulation products 400.

FIG. 4C, illustrates two insulation products 400a that are joined using splice inserts 416c. Insulation products 400a may be similar to insulation products 200 described above, and may each include insulation materials 402a having a first end 404a and a second end 406a. The first end 404a may include one or more partially circular protrusions 410a' and the second end 406a may define one or more partially circular cutouts 410b' that are in alignment with a corresponding one of the protrusions 410a'. It will be appreciated that some embodiments may include a combination of protrusions 410a' and cutouts 410b' on each of the first end 404a and the second end 406a. The first end 404a of one of the insulation products 400a is secured to a first end 404a of another of the insulation products 400a using a splice insert 416c, which may be similar to splice insert 416a. As illustrated, splice insert 416c has a number of cutouts 418c on both a first end and a second end of the splice insert 416c. The cutouts 418c are sized and shaped to match the protrusions 410a', such that splice insert 416c may be coupled with the first end 404a of each of the insulation products 400a to secure the two first ends 404a together to form a larger insulation product. For example, the protrusions 410a' of each first end 404a may be inserted within the cutouts 418c of the splice insert 416c to secure the insulation products 400a together. In some embodiments, one or more reinforcement members 414 may be used to reinforce the seams 412c formed by the splice insert 416c and insulation products 400a.

FIG. 4D, illustrates two insulation products 400a that are joined using splice inserts 416d. Insulation products 400a may be similar to insulation products 200 described above, and may each include insulation materials 402a having a first end 404a and a second end 406a. The first end 404a may include one or more partially circular protrusions 410a' and the second end 406a may define one or more partially circular cutouts 410b' that are in alignment with a corresponding one of the protrusions 410a'. It will be appreciated that some embodiments may include a combination of protrusions 410a' and cutouts 410b' on each of the first end 404a and the second end 406a. The second end 406a of one of the insulation products 400a is secured to a second end 406a of another of the insulation products 400a using a splice insert 416d, which may be similar to splice insert 416b. As illustrated, splice insert 416d has a number of protrusions 418d on both a first end and a second end of the splice insert 416d. The protrusions 418d are sized and shaped to match the cutouts 410b', such that splice insert 416d may be coupled with the second end 406a of each of the insulation products 400a to secure the two second ends 406a together to form a larger insulation product. For example, the protrusions 418d of the splice insert 416d may be inserted into the cutouts 410b' of each second end 406a to secure the insulation products 400a together. In some embodiments, one or more reinforcement members 414 may be used to reinforce the seams 412d formed by the splice insert 416d and insulation products 400a.

While shown with trapezoidal and/or partially circular shaped cutouts and protrusions, it will be appreciated that the splice inserts may have any shape, size, and/or combination of cutouts and/or protrusions that enable the splice inserts to be interlocked with the first end and/or second end of the various insulation products.

Figure 5:
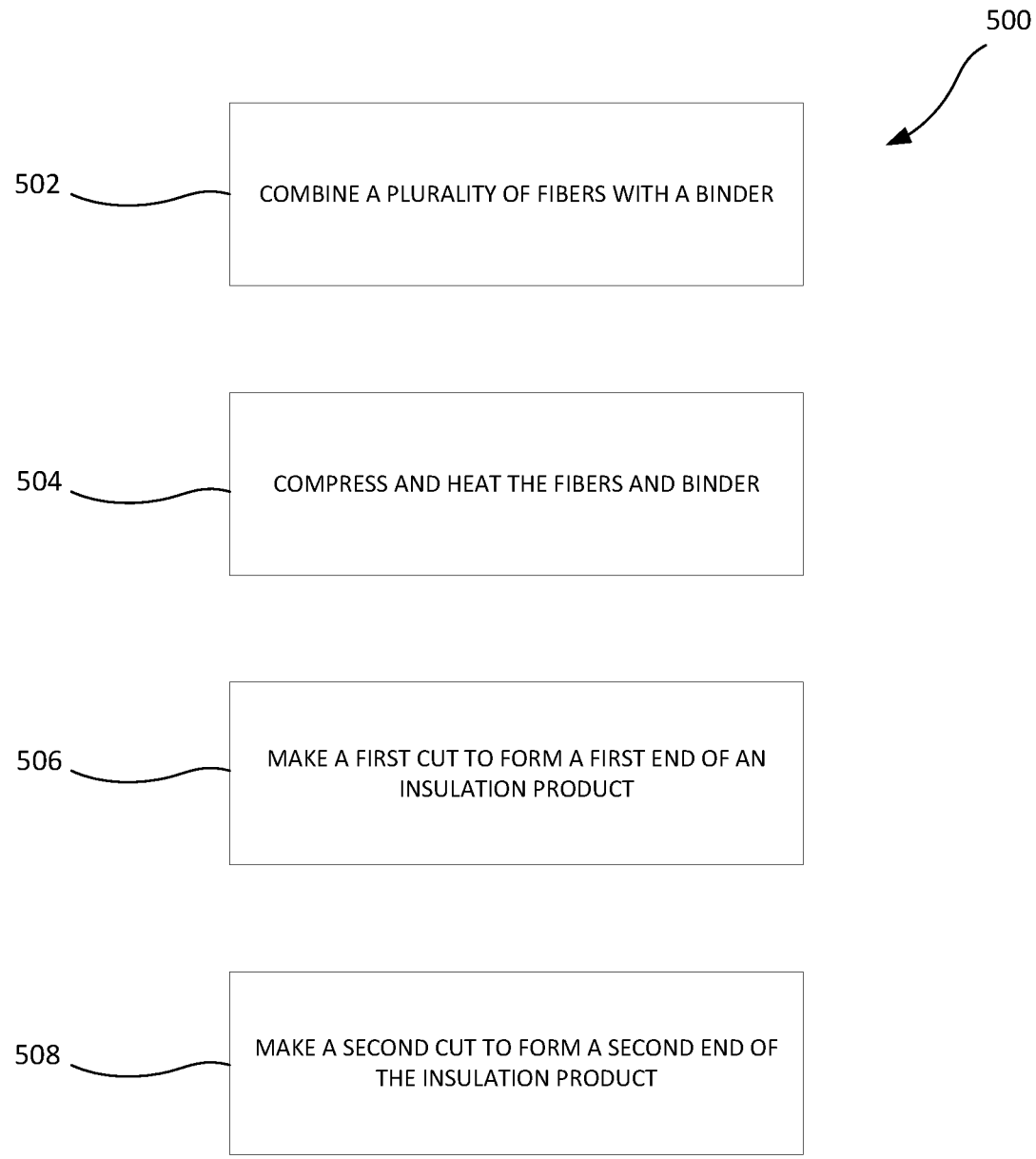
FIG. 5 is a flowchart illustrating a process for manufacturing interlocking insulation products coupled using a splice insert according to some embodiments of the present technology.

FIG. 5 illustrates a flowchart of a process 500 for manufacturing an insulation product. Process 500 may be used to produce insulation products, including insulation products 100, 200, and 400 described herein. Process 500 may be performed using system 300 and may begin at operation 502 by providing an insulation material that includes nonwoven insulation, aerogel insulation, mineral insulation, and/or foam insulation. In some embodiments, providing the insulation material may include manufacturing the insulation material. As just one example for nonwoven insulation, providing the insulation may include combining a plurality of fibers with a binder. The fibers may be glass, polymeric, and/or textile fibers, which may be formed into a mat, blanket, batt, board and/or other insulation material. A binder may be applied to secure the fibers together. In a particular embodiment, the fibers may be formed using a fiberizer and a binder may be applied to the fibers as the fibers fall onto a conveyor belt and form the insulation material. The coated fibers may be compressed and heated at operation 504 to cure the binder and form an insulation material. For example, the coated fibers may be passed into a cure oven, where heat and/or pressure are applied to cure the binder and form an insulation material of a desired thickness. It will be appreciated that other manufacturing techniques may be used for nonwoven and/or other forms of insulation materials.

In some embodiments, the lateral edges of the insulation material may be trimmed to a desired width. In some embodiments, a thickness of the insulation material may be sawed through to form a multi-layer insulation material. At operation 506, a first cut may be made in the insulation material to form a first end of an insulation product. At operation 508, a second cut may be made in the insulation material at a distance from the first cut to form a second end of the insulation product. The first cut and the second cut are made using a nonlinear blade that cuts one or more interlocking features (such as undercut protrusions and/or cutouts) into the first end and second end. Once the insulation products are cut, the insulation products may be compressed, rolled, and/or packed for storage and/or transport to a final site and/or an intermediate site for further processing to make final products.

Figure 6:
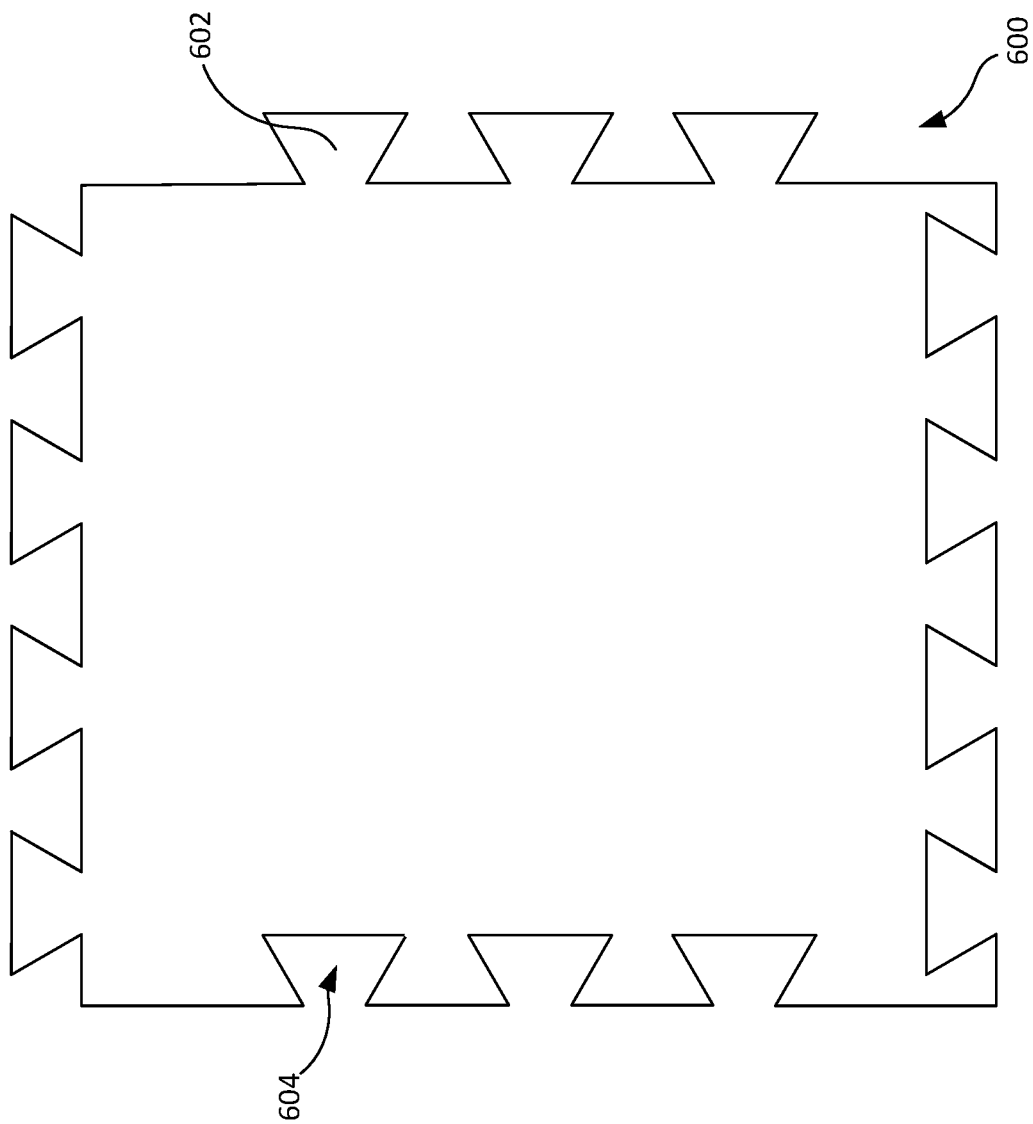
FIG. 6 illustrates an embodiment of an insulation product having interlocking features according to embodiments of the present invention.

Some embodiments of the present technology may be directed to insulation installation systems that incorporate interlocking designs. For example, finished insulation products, such as mats, boards, and/or other materials may be cut to include interlocking features on two or more sides of the insulation products. For example, each piece of insulation product may be formed to have a shape that is similar to insulation products 100 or 200, with interlocking features on opposing ends of the insulation product. Such a design may enable the insulation products to be secured end to end in a daisy chain fashion to assemble connected strips of insulation material on a horizontal and/or vertical surface. In other embodiments, the insulation products may include interlocking features on all sides of the insulation product. For example, as illustrated in FIG. 6, an insulation product 600 (which may include any of the features described in relation to the insulation products described herein) may include interlocking features on all sides of the insulation product 600. As illustrated, opposing ends of the insulation product 600 may have protruding interlocking features 602 and cutouts 604. Such a design may enable each insulation product in an installation system to be identical. It will be appreciated that other arrangements are possible in various embodiments. For example, in some embodiments all of the interlocking features on a given insulation product will be protrusions or cutouts, such that two different types of insulation products 600 are necessary to install the insulation products 600. In various embodiment, any permutation of cutouts, protrusions, and/or other interlocking features may be utilized. Additionally, the shapes of the interlocking features may include any shapes that interlock, such as those shapes with undercut features as previously described. Insulation products 600 may be installed by arranging the insulation products 600 against a surface such that interlocking features of adjacent insulation products 600 engage one another to secure the insulation products 600 together to create a generally uniform insulation surface.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An insulation product, comprising:
   a first insulation material comprising at least one material selected from the group consisting of nonwoven insulation, aerogel insulation, mineral insulation, and foam insulation;
   and a second insulation material comprising at least one material selected from the group consisting of nonwoven insulation, aerogel insulation, mineral insulation, and foam insulation, wherein:
   each of the first insulation material and the second insulation material comprises a first end, a second end opposite the first end, and lateral edges that extend between the first end and the second end;
   the lateral edges are substantially linear;
   the first end of each of the first insulation material and the second insulation material comprises a protrusion;
   the second end of each of the first insulation material and the second insulation material defines a cutout that has a size and shape that substantially matches a size and shape of the protrusion; and
   the protrusion of the first insulation material is insertable within the cutout of the second insulation material to couple the first insulation material and second insulation material in an end to end fashion and to align the lateral edges of the first insulation material and the second insulation material are aligned with one another.

2. The insulation product of claim 1, wherein:
   the protrusion of the first insulation material is inserted within the cutout of the second insulation material, thereby securing the first insulation material and second insulation material together in an end-to-end configuration.

3. The insulation product of claim 2, further comprising:
   a reinforcement member positioned over a seam formed between the first insulation material and the second insulation material.

4. The insulation product of claim 3, wherein:
   the reinforcement member comprises one or both of a glass mat facer and adhesive tape.

5. The insulation product of claim 1, further comprising:
   a splice insert positioned between the first insulation material and the second insulation material, the splice insert comprising interlocking features that receive the protrusions of each of the first ends or that are insertable within the cutouts of each of the second ends to secure the first insulation material and second insulation material together in an end-to-end configuration.

6. The insulation product of claim 5, further comprising:
   a reinforcement member positioned over seams formed between the first insulation material, the splice insert, and the second insulation material.

7. The insulation product of claim 5, further comprising:
   a first reinforcement member positioned over a first seam formed between the first insulation material and the splice insert; and
   a second reinforcement member positioned over a second seam formed between the splice insert and the second insulation material.

8. The insulation product of claim 5, wherein:
   the splice insert extends an entire distance between the lateral ends of the first insulation material and the second insulation material.

* * * * *